(12) United States Patent
Leung et al.

(10) Patent No.: US 6,731,297 B1
(45) Date of Patent: May 4, 2004

(54) MULTIPLE TEXTURE COMPOSITING

(75) Inventors: Kam Leung, El Dorado Hills, CA (US); Val G. Cook, Shingle Springs, CA (US); Peter L. Doyle, El Dorado Hills, CA (US); Wing Hang Wong, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/885,253

(22) Filed: Jan. 11, 2000

(51) Int. Cl.$^7$ .................................................. G09G 5/00
(52) U.S. Cl. ...................... 345/582; 345/589
(58) Field of Search ........................ 345/581, 582, 345/586, 589, 592

(56) References Cited

U.S. PATENT DOCUMENTS 5,870,102 A  2/1999  Tarolli et al.
6,392,655 B1 * 5/2002 Migdal et al. ............... 345/582
6,483,505 B1 * 11/2002 Morein et al. .............. 345/419

* cited by examiner

*Primary Examiner*—Matthew Luu
(74) *Attorney, Agent, or Firm*—Blakely, Sokoloff, Taylor & Zafman LLP

(57) ABSTRACT

A machine readable storage media containing executable program instructions which when executed cause a digital processing system to seta plurality of operands and operators. A plurality of texture maps are sent to a processor for texture compositing. Operands are selected for a texture operation. A first logic is used wherein if the circulation of blend stages is equal to a number of blend stages, then a color saturation is performed, and a second logic that if the circulation number of blend stages does not equal the number of blend stages then at least one operand is selected for another texture compositing operation.

17 Claims, 13 Drawing Sheets

MULTIPLE TEXTURE COMPOSITING

FIELD OF THE INVENTION

The invention relates generally to three-dimensional graphics and more specifically to texture compositing.

BACKGROUND

Personal computers and home video game computers use graphics images to visually portray an act or idea. To create graphic images, graphic primitives may be used. "Graphics primitives" are a basic component of a graphics picture, such as a polygon, e.g., a triangle, or a vector. Graphic pictures are formed with combinations of these graphic primitives.

Early graphics systems displayed images representing objects having extremely smooth surfaces. That is, textures, bumps, scratches, or other surface features were not modeled. In order to improve the quality of the image, texture mapping was developed to model the complexity of real world surface images. A texture map is an object. Texture mapping is the mapping of an image or function onto a surface in three dimensions.

Generally, texture compositing is then performed on a texture map. Texture compositing blends two maps together producing a single image which demonstrates various visual effects. For example, one map can represent a traditional texture map while the second map functions as a "light map" which modulates the first map. This produces a diffuse lit appearance resembling static area light sources. Texture compositing is also commonly used to produce such effects as: specular highlights, static Phong shading, and various transparency effects. The source surfaces need not be of the same type or resolution. Both maps may be addressed using a single set of texture coordinates or may have two separate sets of coordinates.

In conventional systems, texture compositing occurs in series. Accordingly only two texture maps undergo texture compositing in a single pass. To perform multiple texture compositing, increased computer equipment is generally required.

It is desirable to have a system that allows for multiple texture compositing while reducing the resources that are necessary to perform multiple texture compositing.

SUMMARY

A machine readable storage media containing executable program instructions which when executed cause a digital processing system to set a plurality of operands and operators. A plurality of texture maps are sent to a processor for texture compositing. Operands are selected for a texture operation. A first logic is used wherein if the circulation number of blend stages is equal to a number of blend stages, then a color saturation is performed, and a second logic that if the circulation number of blend stages does not equal the number of blend stages then at least one operand is selected for another texture compositing operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

The present invention relates to a method and an apparatus for forming multiple textural compositing. The following detailed description and the accompanying drawings are provided for the purpose of describing and illustrating presently preferred embodiments of the invention only are not intended to limit the scope of the invention.

In one embodiment of the invention, a machine readable storage media is disclosed containing executable program instructions which when executed cause a digital processing system to perform a method such that a plurality of operands and operators are set. A plurality of texels on the same pixels is sent to a processor for texture compositing operations. Texels is the color values that make up two dimensional texture maps. Operands are then selected for the texture compositing operation. An operand can be the texels, the color from texture map, the diffused color, specular color, fug color of a pixel. An operator is selected to control how the compositing is performed, such as multiply, add, subtract, and blend. Next, the number of texture compositing is determined based upon the circulation number designated by the system designer. A first logic is used if the circulation of blend stages is equal to a number of blend stages then a color saturation is performed. A second logic is executed if the circulation number of blend stages does not equal the number of blend stages, then at least one operand is selected for another texture compositing operation.

Figure 1:
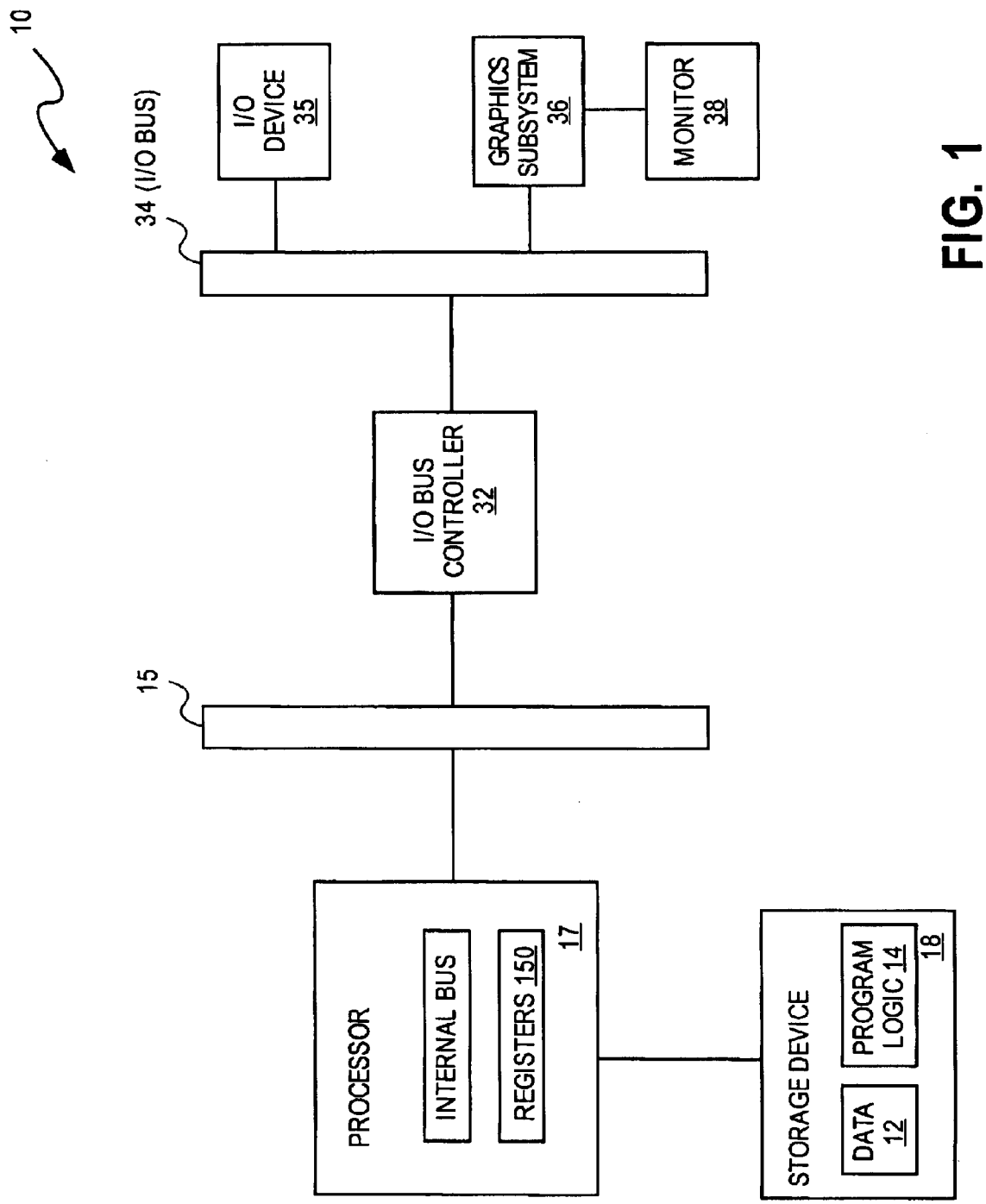
FIG. 1 illustrates one embodiment of a computer system which implements the principles of the present invention.

FIG. 1 illustrates one embodiment of a computer system 10 which implements the principles of the present invention. Computer system 10 comprises a processor 17, a storage device 18, a bus 15, an I/O bus controller 32, an I/O device 35, a graphics subsystem 36, and monitor 38. Processor 17 is coupled to the storage device 18 by bus 15. Processor 17 represents a central processing unit of any type of architecture (e.g., the Intel architecture, Hewlett Packard architecture, Sun Microsystems architectures, IBM architectures, etc.), or hybrid architecture. In addition, processor 17 could be implemented on one or more chips. Storage device 18 represents one or more mechanisms for storing data such as coordinates that comprise pixels. Storage device 18 may include read only memory (ROM), random access memory (RAM), magnetic disk storage mediums, optical storage mediums, flash memory devices, and/or other machine-readable mediums. Bus 15 represents one or more buses (e.g., AGP, PCI, ISA, X-Bus, VESA, etc.) and bridges (also termed as bus controllers).

Bus 15 is coupled to I/O bus controller 32 which is coupled to conventional I/O bus 34. I/O bus 34 is further coupled to I/O device 35 and graphics subsystem 36. Graphics subsystem 36, coupled to monitor 38, drives monitor 38.

While this embodiment is described in relation to a single processor computer system, the invention could be implemented in a multi-processor computer system. In addition to other devices, one or more of a network 30 may be present. Network 30 represents one or more network connections for transmitting data over a machine readable media. The invention could also be implemented on multiple computers connected via such a network.

FIG. 1 also illustrates that the storage device 18 has stored therein data 12 and program logic 14. Data 12 represents data stored in one or more of the formats described herein. Program logic (e.g., software, computer program etc.) 14 represents the necessary code for performing any and/or all of the techniques described with reference to FIGS. 2–9C. It will be recognized by one of ordinary skill in the art that the storage device 18 preferably contains additional program logic (not shown), which is not necessary to understanding the invention.

Figure 2:
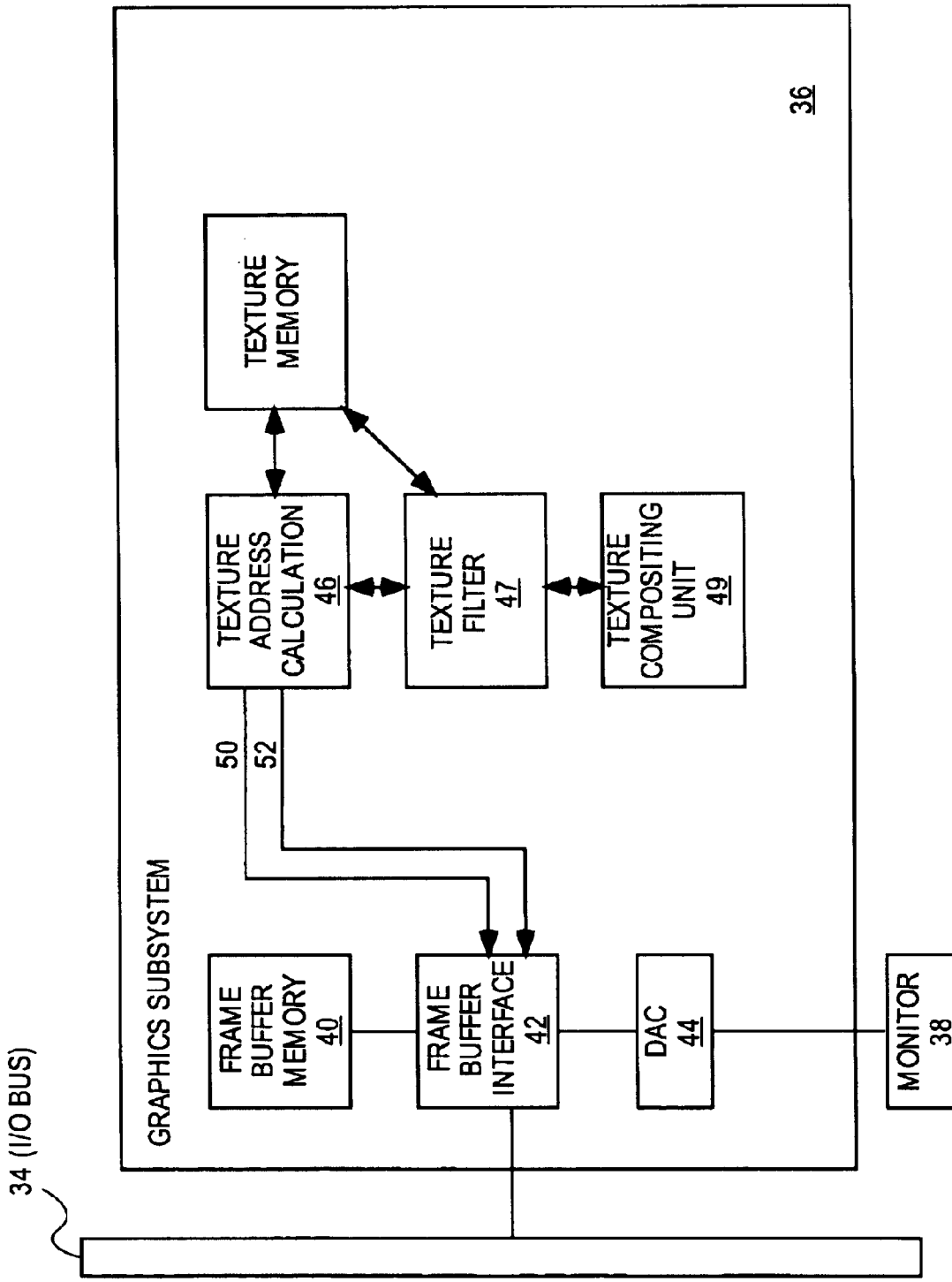
FIG. 2 illustrates a graphics subsystem unit in accordance with one embodiment of the invention.

FIG. 2 illustrates a graphics subsystem in accordance with one embodiment of the invention. A frame buffer interface (FBI) 42 is coupled to I/O bus 34 and to digital to analog converter (DAC) 44, and to a texture address calculation unit (TACU) 46. FBI 42 controls output to monitor 38. DAC 44 is also coupled to monitor 38. TACU 46 is coupled to texture filter 47. Texture filter 47 performs a conventional filtering function. Texture filter 47 is further coupled to texture compositing unit (TCU) 49.

Figure 3:
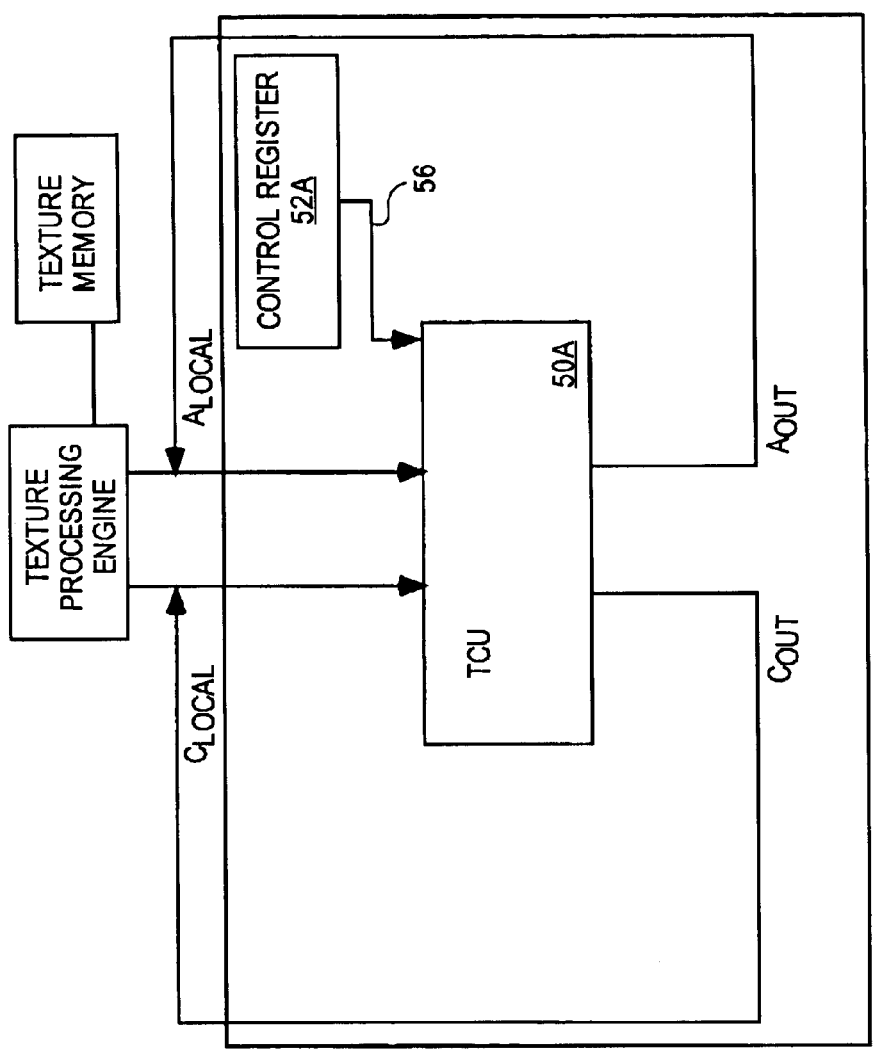
FIG. 3 illustrates a texture mapping unit and texture memory in accordance with one embodiment of the invention.

FIG. 3 illustrates a texture memory, a texture processing unit, and a control register 52A. Control register 52A controls data and signals such as the selection of operands, operators, and setting the circulation number. The operand is typically in a 32 bit red-green-blue format (RGB) or YUV format having 8 bits (or any other number of bits) allocated for each texture color component. It is to be appreciated that each texture color component can be represented by a different number of bits and that different and additional texture colors can be used. The circulation number is the number of times that the texture compositing operation is performed.

Figure 4:
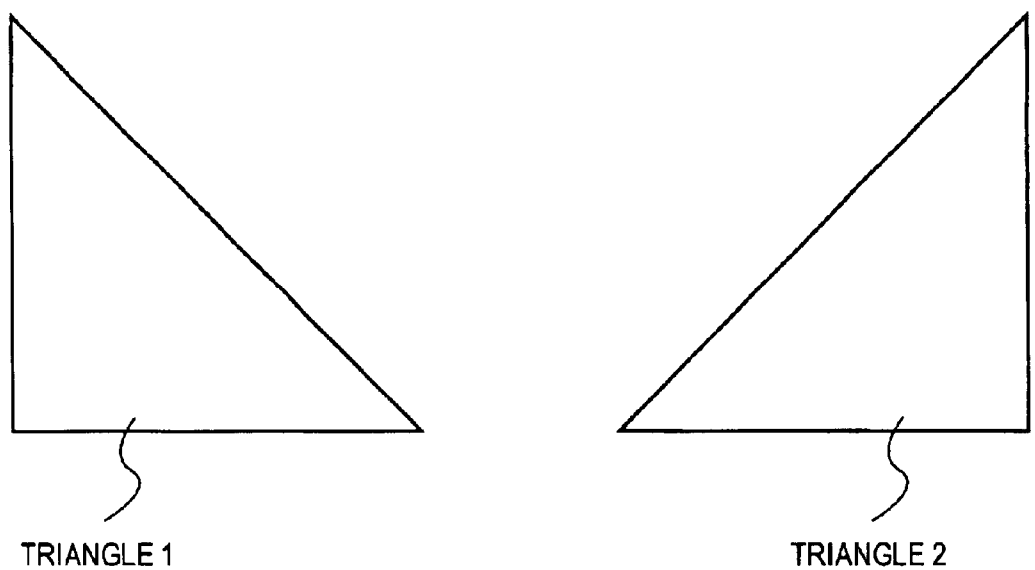
FIG. 4 illustrates two triangles that are to be mapped into the same polygon.

FIG. 4 illustrates two triangles that are to be mapped into the same polygon.

Figure 5:
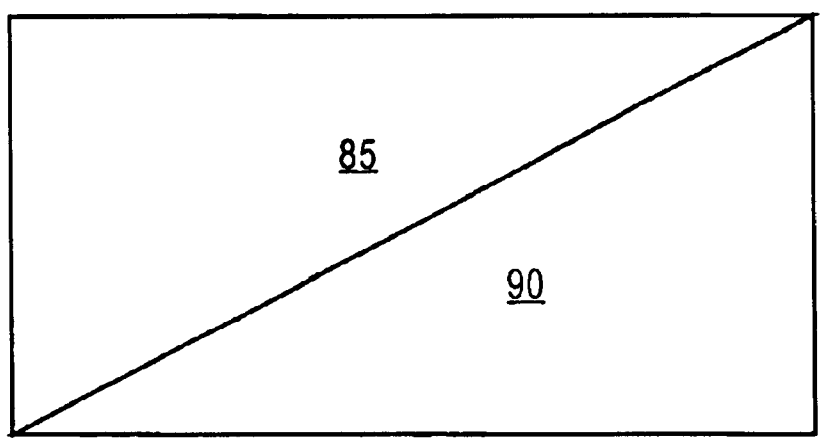
FIG. 5 illustrates a square comprised of two triangles that may be used to create a three dimensional image.
Figure 6A:
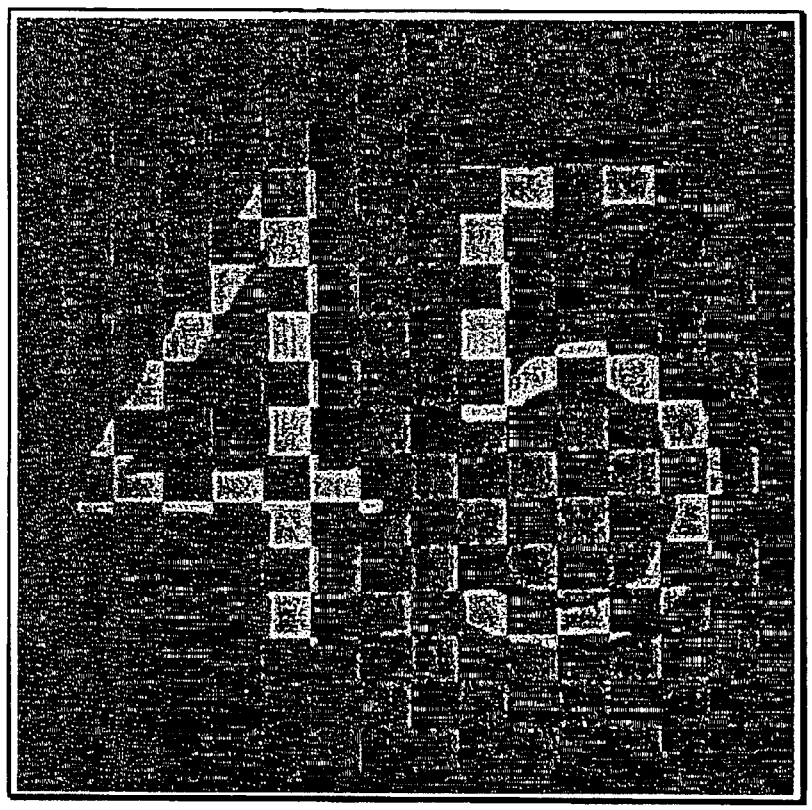
FIGS. 6A–6C illustrate three different texture maps that are to be mapped into the triangles of FIG. 4.
Figure 6B:
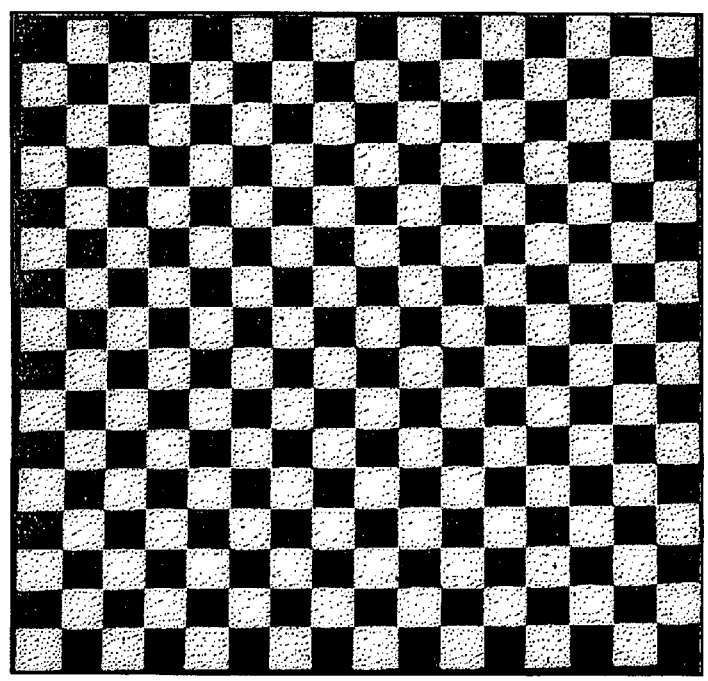
Figure 6C:
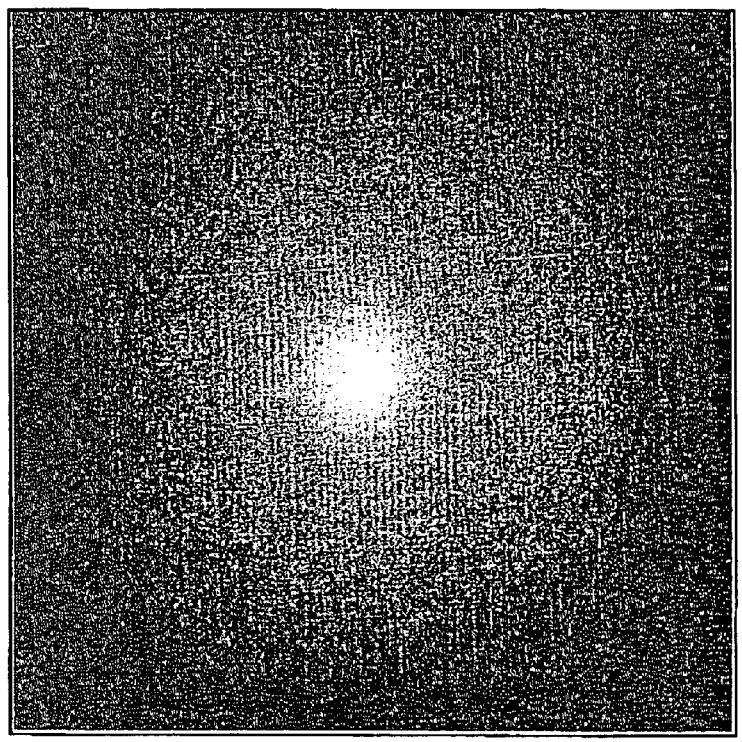

FIG. 5 illustrates a square comprised of two triangles that may be used in order to create a three-dimensional multiple texture mapped for displays used in, for example, computer programs, a picture is placed into a bit-map that may comprise a plurality of polygons. The triangle coordinates, such as for triangle 90 represented by V(0,0), V(1,1) are then stored in the storage device 18 of the computer system. These texture coordinates that are mapped into the triangles is used by the texture address calculation unit to calculate the memory address such that the pixel values can be fetched from texture memory. The texture map 1 coordinate in FIG. 6A is coordinated into map of triangle 90 in $T_1(0,0)$, $T_1(1,0)$, and $T(1,1)$. The texture map 2 in FIG. 6B is coordinated into triangle 90 with the map represented by $T_2(0,0)$, $T_2(1,0)$ and $T(2,2)$. FIG. 6C is mapped into triangle 90 by $T_3(0,0)$, $T(1,0)$ and $T_3(1,1)$. The texture maps and vertices are shown in FIG. 5.

All of these vertices of each triangle is stored in storage device 18. Each pixel stored in storage device 18 must be fetched from the storage device 18 and placed onto the screen to show at least one texture map. When storing a bit-map in storage device 18, it is stored in bit-map format such as RGB or YUV format.

FIGS. 6A–6C illustrate three different texture maps that are to be mapped into the triangles of FIG. 4 as described above.

Figure 7:
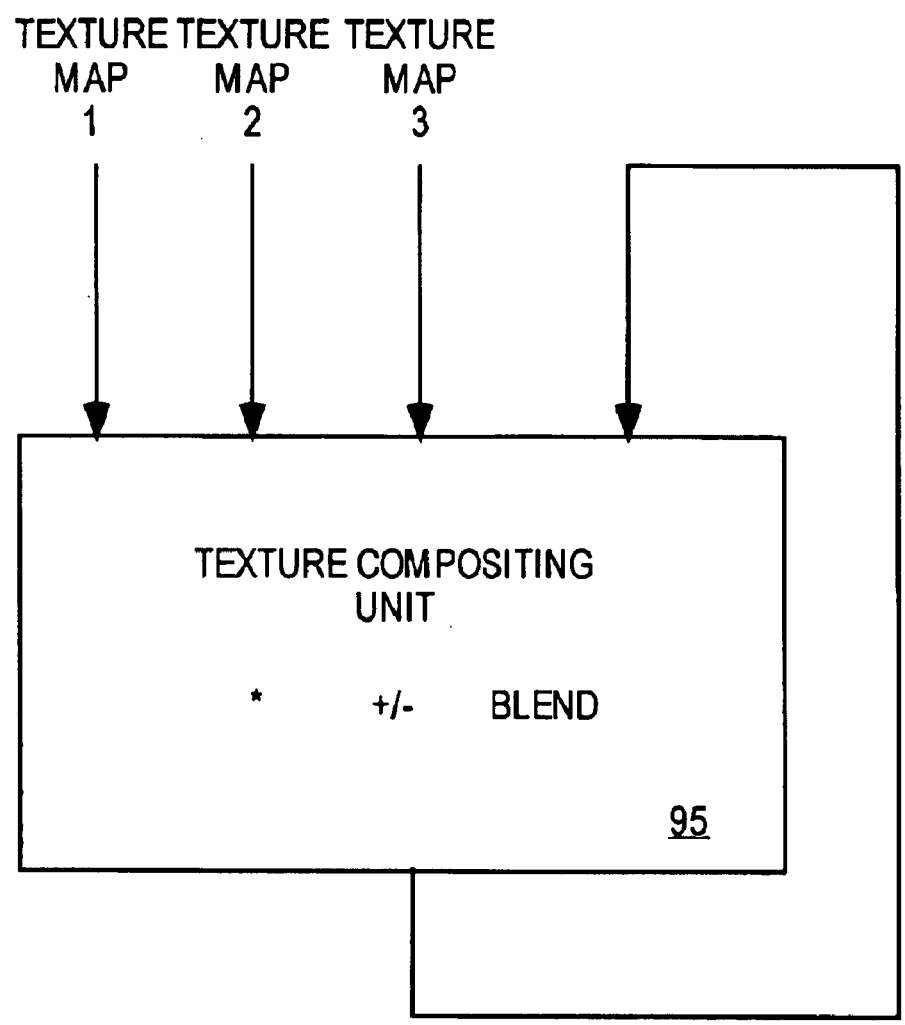
FIG. 7 illustrates a block diagram of multiple texture maps being used in multiple texture compositing in a single blend stage wherein the results from a prior blend operation may be re-circulated or go through a multiple pass.

FIG. 7 illustrates a block diagram of a texture compositing unit (TCU) wherein data from multiple texture maps is being used in a number of texture compositing operations using a single blend stage. The results from a prior texture compositing operation may be re-circulated as input for the next texture compositing operation (e.g., a multiple pass is performed). Block 95 shows the operators (or logic units) that may be used such as a multiplication, addition, subtraction, and blend operation that are used to composite the color of each texture map created by multiple textural compositing. A multiplier logic unit receives an input operand and performs a multiplication based upon the control signal. The multiplier unit combines the color of the operands. The add logic unit receives the input operands and performs an addition operation on the input operands based upon the control signal. Addition makes the color brighter. The subtraction logic unit receives the input operands and performs a subtraction opersation based upon the control signal. Subtraction makes the color darker. The blend unit receives the input operand and performs a blending operation on the inputs based upon the control signal. The blend operation involves a color compositing (e.g., transparency).

Figure 8:
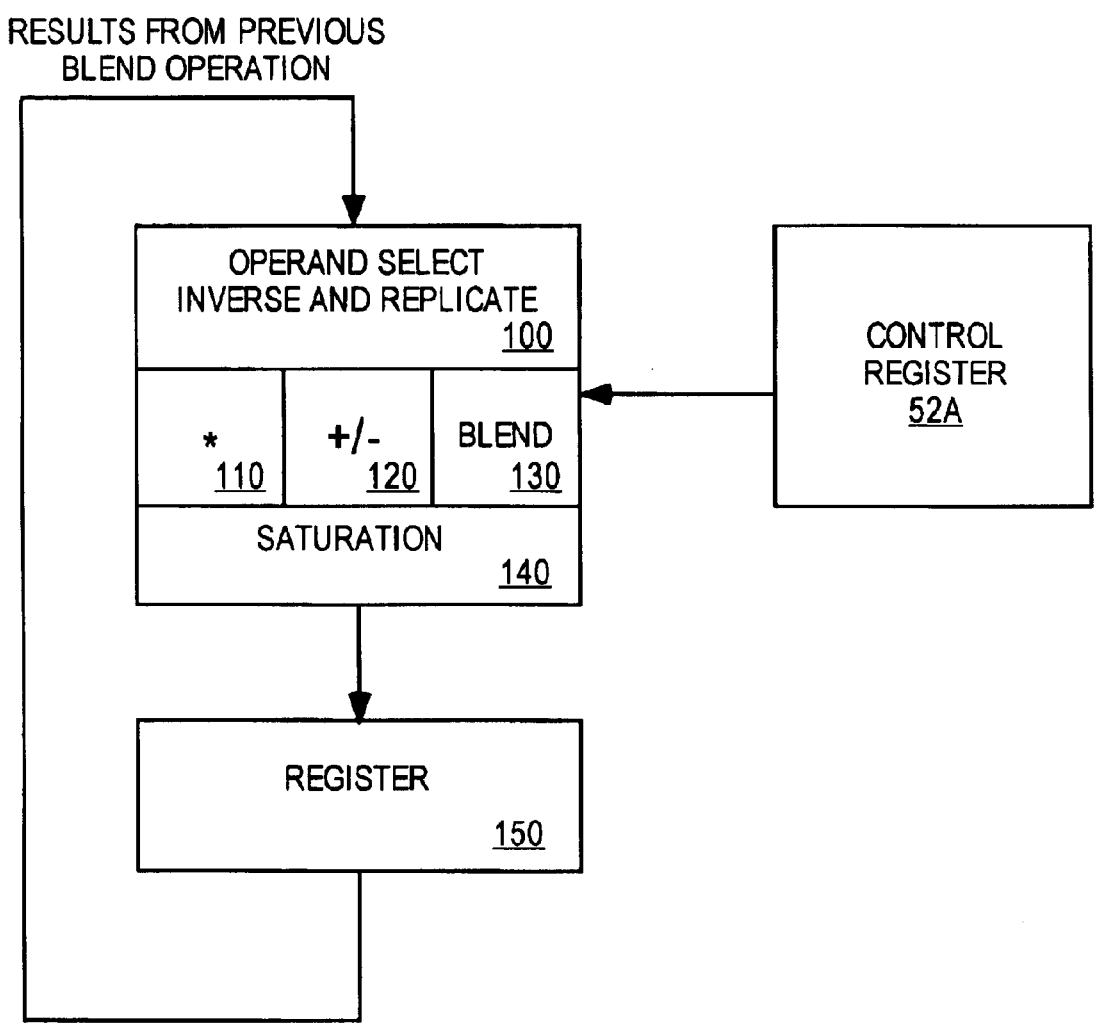
FIG. 8 provides a more detailed illustration of the re-circulation or multiple passing operation performed for multiple textural mapping in one embodiment of the invention.

FIG. 8 provides a more detailed illustration of the re-circulation or multiple passing operation performed for multiple textural mapping in one embodiment of the invention. In this embodiment, the operation begins at control register 52A. Control register 52A sets up the number of blend stages to be used. Control register 52A also establishes how many circulation number of blend stages to be performed, for example, the circulation number of blend stages may be one, two, three, or any other number established by the system designer or a user. The next step is to program in the type of operation to be performed. The operations that are programmed involve multiplying at 110, adding or subtracting color at 120 (e.g., subtraction makes the color darker) or a blending operation at 130 for visual effect such as transparency. At operation 140, color saturation may be performed. This means that the final color of the texture compositing are clamped to either a minimum value (e.g., black), or maximum value (e.g., white) if the result exceeds the range of the representable precision. The values of each pixel is then stored in register 150. At operation 100, the results from this last blend operation is then re-circulated to the input of the texture compositing unit. The color and alpha values can be used as an operand of the next texture compositing operation. The operand can be selected, inverted, and replicated for the next texture compositing operation.

Figure 9A:
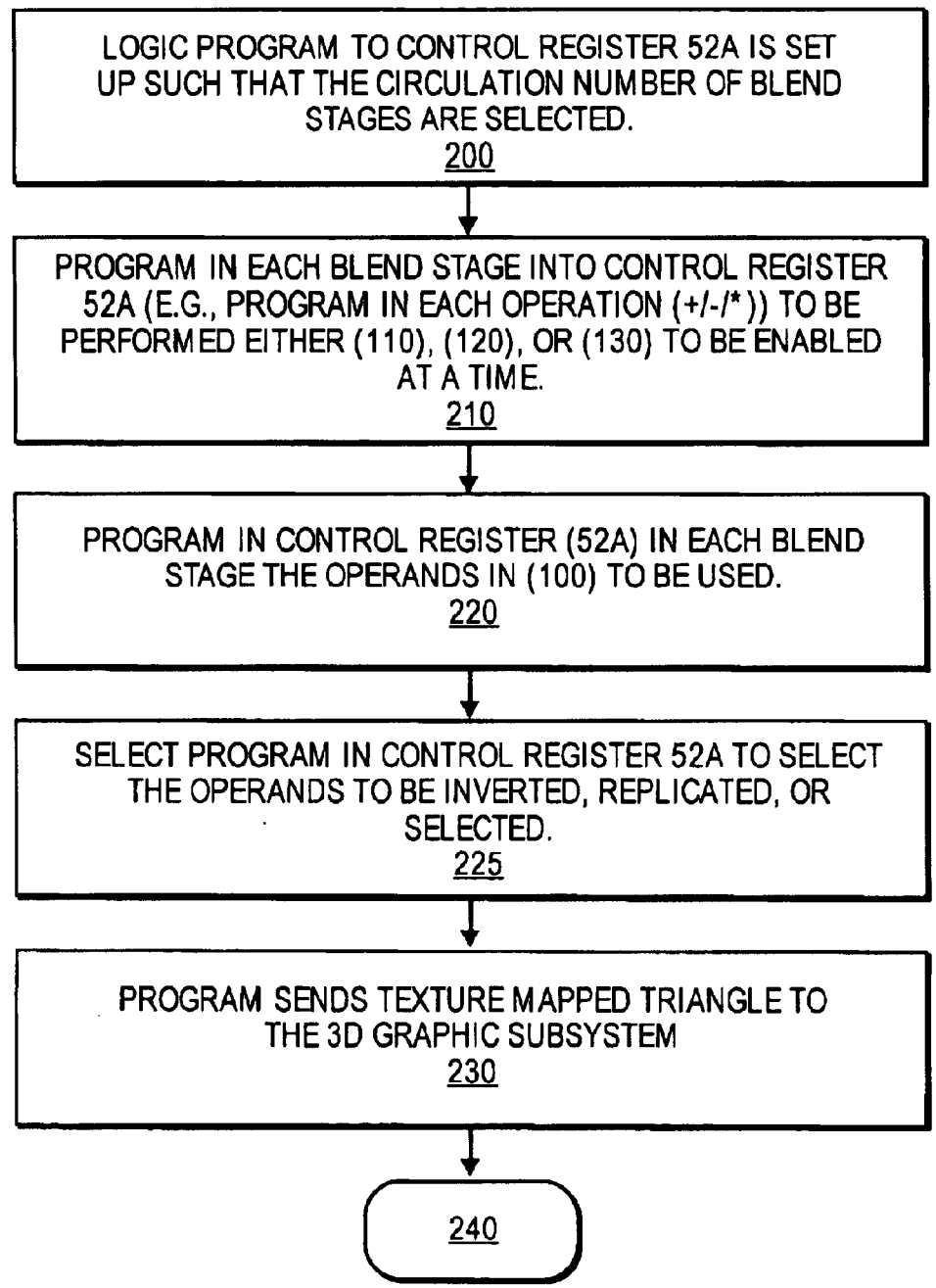
FIGS. 9A–9C illustrate a flow chart of one embodiment of the invention.
Figure 9B:
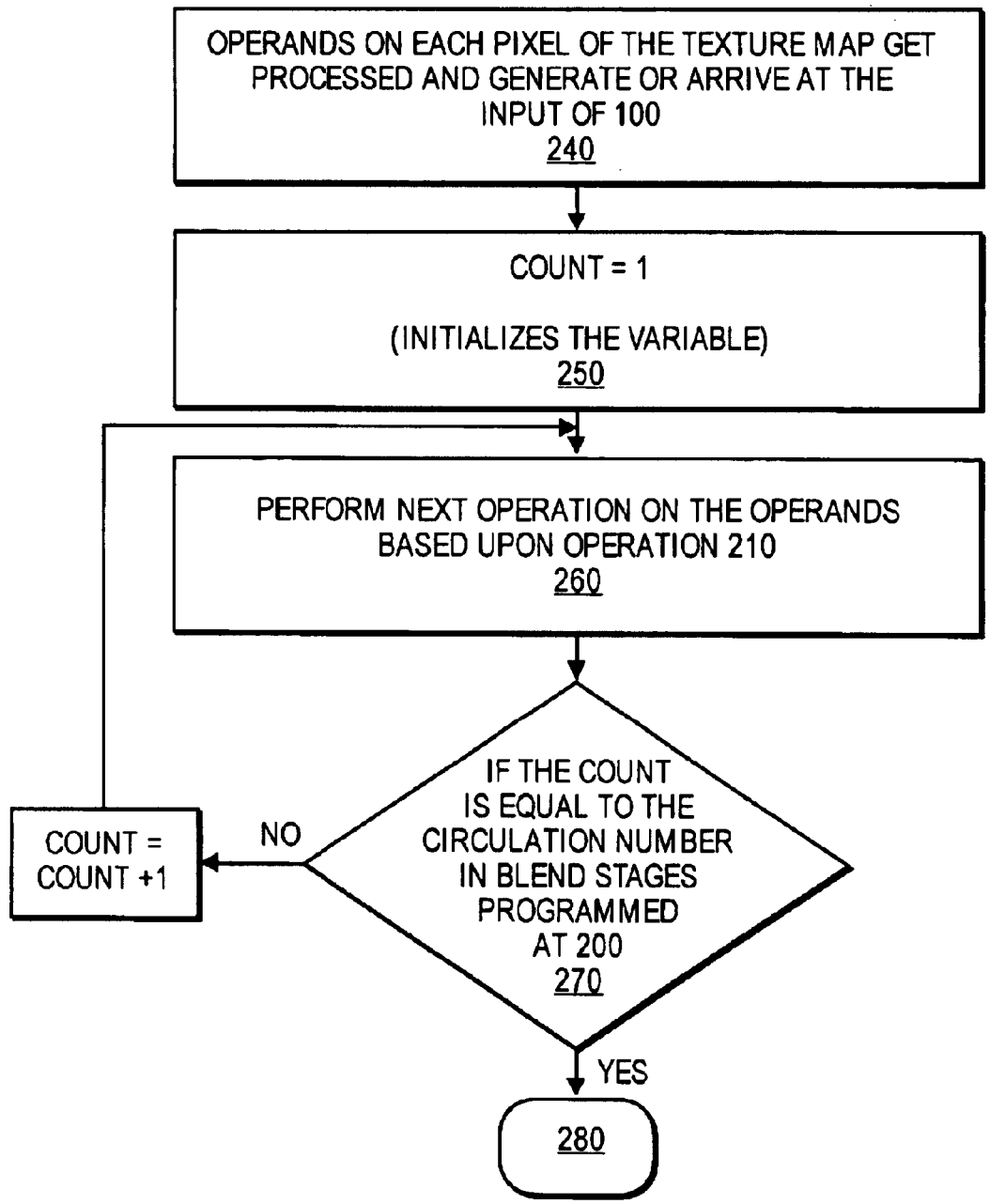
Figure 9C:
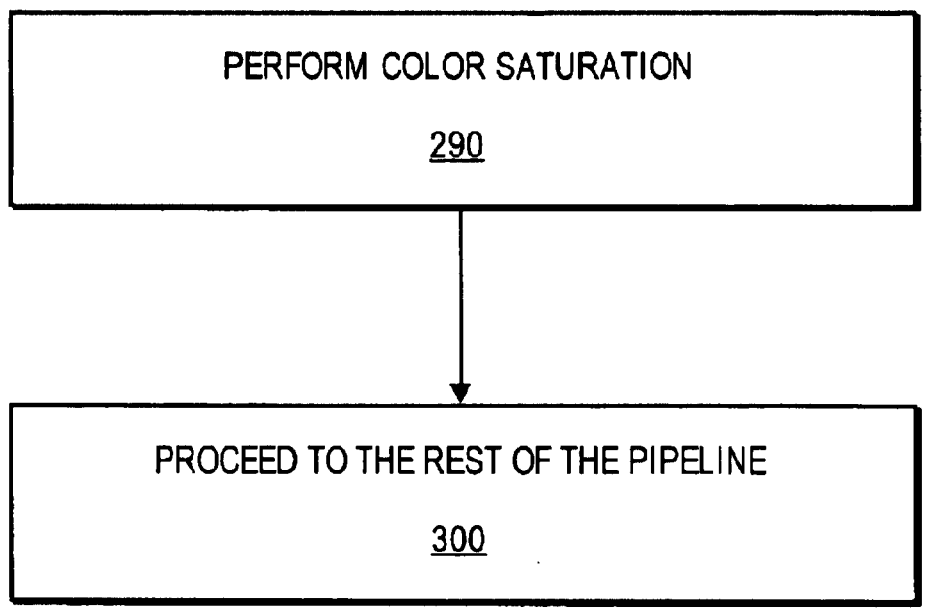

FIGS. 9A–9C illustrate a flow chart of one embodiment of the invention. At operation 200, a logic program is programmed into the control register and control register 52A is set up such that the number of blend stages are selected. At operation 210, control register 52A has each blend stage programmed therein and each operator (or logic unit) for each operation is also programmed therein (e.g., an operator or logic unit includes (a multiplier unit, an addition unit, a subtraction unit, and a blend unit) to be performed or to be enabled at a specified time. At operation 220, control register 52A has in each blend stage, the operands programmed in argument, select, inverse, and replicate (100) to be used. At operation 230, a program such as a software driver sends a texture mapped polygon to a three-dimensional graphic subsystem. At operation 250, a variable such as COUNT is initialized to a value of 1 (i.e., COUNT=1). At operation 260, the texture compositing operation is performed based upon operator program at operation 210. At operation 270, if count is equal to circulation number of the blend stages at operation 200 then color saturation is performed at operation 290. Thereafter, the rest of the pipeline is followed at operation 300. However, if the count is not equal to circulation number of blend stages programmed at operation 200, the results of the current texture compositing operation is re-circulated to be used in the next texture compositing operation.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A machine readable storage media containing executable program instructions which when executed cause a digital processing system to perform a method comprising:

setting a plurality of operands and operators;

sending a plurality of texture maps to a processor for a texture compositing operation;

selecting operands for a texture compositing operation;

a first logic wherein if the circulation of blend stages is equal to a number of blend stages then performing a color saturation, and a second logic that if the circulation number of blend stages does not equal the number of blend stages then select at least one operand for another texture compositing operation without performing the color saturation.

2. The media of claim 1, further comprising:

inputting data for a first polygon.

3. The media of claim 2, further comprising modifying the first polygon.

4. The media of claim 1, further comprising setting the number of times to re-circulate and the textural operation.

5. The media of claim 1, further comprising:

selecting at least two operands.

6. The media of claim 1, comprising:

sending a texture mapped polygon to a three dimensional graphic subsystem.

7. The media of claim 1, comprising:

performing color saturation on a polygon of the first texture map.

8. A method comprising:

setting at least one operand;

creating at least one textural map;

sending the textural map to a three dimensional graphic subsystem;

selecting at least one operand for a textural operation;

performing a color saturation if a number of circulation blend stages equals a number of blend states and performing a re-circulation operation without performing the color saturation if the number of circulation blend stages does not equal the number of blend stages.

9. The method of claim 8, further comprising:

inputting data for a first polygon.

10. The method of claim 8, further comprising selecting at least two operands.

11. The method of claim 8, comprising sending a texture mapped polygon to a three dimensional graphic subsystem.

12. The method of claim 8, wherein a state variable and circulation control sets the blend states.

13. A computer system comprising:

a storage device coupled to a processor and having stored therein at least one routine, which when executed by the processor, causes the processor to generate data, the routine at least causing the processor to at least, set a number of blend states;

set each blend stage;

set at least one operand for each blend stage;

a driver sends at least one textured mapped polygon to a pipeline;

color values of the textured mapped polygon is processed;

a first logic that if the number of circulation does not equal to the number of blend stages, then a re-circulate operation is performed without performing color saturation and a second logic that if the number of circulation is equal to the number of blend stages, then color saturation is performed.

14. The computer system of claim 13, wherein a state variable and circulation control sets the blend states.

15. The computer system of claim 13, wherein data is inputted into the processor for a first polygon.

16. The computer system of claim 15, wherein the first polygon is modified to a second polygon.

17. The computer system of claim 13, wherein 2 or more operands are selected.

* * * * *

UNITED STATES PATENT AND TRADEMARK OFFICE
CERTIFICATE OF CORRECTION

PATENT NO. : 6,731,297 B1
DATED : May 4, 2004
INVENTOR(S) : Leung et al.

It is certified that error appears in the above-identified patent and that said Letters Patent is hereby corrected as shown below:

Column 3,
Line 57, after "32 bit", insert -- or 16 bit --.

Column 4,
Line 6, after "V(O,O),", insert -- V(1,10), --.

Signed and Sealed this

Seventeenth Day of August, 2004

JON W. DUDAS
*Acting Director of the United States Patent and Trademark Office*